(12) United States Patent
Kum et al.

(10) Patent No.: US 9,701,768 B2
(45) Date of Patent: Jul. 11, 2017

(54) POLYOLEFIN

(71) Applicant: LG CHEM, LTD., Seoul (KR)

(72) Inventors: Don Ho Kum, Daejeon (KR); Choong Hoon Lee, Daejeon (KR); Sang Eun Park, Daejeon (KR); Seung Hwan Jung, Daejeon (KR); Yoon Hee Cho, Daejeon (KR); Young Shil Do, Daejeon (KR); Hae Woong Park, Daejeon (KR); Young Woo Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/021,149

(22) PCT Filed: Sep. 29, 2014

(86) PCT No.: PCT/KR2014/009119
§ 371 (c)(1),
(2) Date: Mar. 10, 2016

(87) PCT Pub. No.: WO2015/046995
PCT Pub. Date: Apr. 2, 2015

(65) Prior Publication Data
US 2016/0222144 A1    Aug. 4, 2016

(30) Foreign Application Priority Data

Sep. 30, 2013  (KR) .................. 10-2013-0116760
Sep. 26, 2014  (KR) .................. 10-2014-0129367

(51) Int. Cl.
*C08L 23/08*   (2006.01)
*C08F 4/653*   (2006.01)
*C08F 4/6592*  (2006.01)
*C08F 210/02*  (2006.01)
*C08F 4/659*   (2006.01)
*C08F 210/16*  (2006.01)

(52) U.S. Cl.
CPC ........ *C08F 210/02* (2013.01); *C08F 4/65904* (2013.01); *C08F 210/16* (2013.01); *C08L 23/0815* (2013.01); *C08F 4/6592* (2013.01); *C08F 4/65908* (2013.01); *C08F 4/65912* (2013.01); *C08F 2420/02* (2013.01)

(58) Field of Classification Search
CPC .............. C08L 23/0815; C08L 2314/06; C08F 4/65904; C08F 4/65908; C08F 4/65912
See application file for complete search history.

(56) References Cited

U.S. PATENT DOCUMENTS

| | | | |
|---|---|---|---|
| 4,547,551 A | 10/1985 | Bailey et al. | |
| 5,064,802 A | 11/1991 | Stevens et al. | |
| 5,883,145 A | 3/1999 | Hurley et al. | |
| 6,455,638 B2 † | 9/2002 | Laughner | |
| 6,506,866 B2 | 1/2003 | Jacobsen et al. | |
| 7,569,175 B1 | 8/2009 | Nilsen et al. | |
| 2006/0241256 A1 | 10/2006 | Baann et al. | |
| 2010/0121006 A1 | 5/2010 | Cho et al. | |
| 2010/0160579 A1 † | 6/2010 | Yang | |
| 2013/0085246 A1 | 4/2013 | Kum et al. | |
| 2013/0296517 A1 | 11/2013 | Noh et al. | |

FOREIGN PATENT DOCUMENTS

| | | |
|---|---|---|
| JP | 2003-507538 A | 2/2003 |
| KR | 10-1996-0010734 A | 4/1996 |
| KR | 10-2005-0088087 A | 9/2005 |
| KR | 10-2010-0023216 A | 3/2010 |
| KR | 10-1097378 B1 | 12/2011 |
| KR | 10-2012-0038798 A | 4/2012 |
| KR | 10-2012-0084695 A | 7/2012 |
| KR | 10-2013-0051467 A | 5/2013 |

OTHER PUBLICATIONS

Gibson et al., "Advances in Non-Metallocene Olefin Polymerization Catalysis", Chem. Rev., 103, pp. 283-315, 2003.
International Search Report issued in PCT/KR2014/009119 dated Dec. 26, 2014.
Database WPI Week 201314; 201512, Thomson Scientific, London, GB; AN 2012-E99393, XP002767294, 2013, 2 pages.
Database WPI Week 201381; 201435, Thomson Scientific, London, GB; AN 2013-K00199, XP002767295, 2013, 2 pages.
Extended European Search Report for European Application No. 14849825.6, dated Mar. 17, 2017.
Varma-Nair, M., Williams, M., & Dharmarajan, N. (2004). Structure-property relationships in metallocene based ethylene-octene plastomers. In ANTEC . . . conference proceedings (vol. 2, pp. 2178-2185). Society of Plastics Engineers.†

† cited by third party

*Primary Examiner* — Caixia Lu
(74) *Attorney, Agent, or Firm* — Birch, Stewart, Kolasch & Birch, LLP

(57) ABSTRACT

The present invention relates to a polyolefin having a molecular weight distribution of 1.5 to 3.0 and having a branch gradient number (BGN) of 0.01 to 1.0. According to the present invention, there is provided the polyolefin having a narrow molecular weight distribution and showing a unique comonomer distribution to have excellent impact strength and mechanical physical properties.

11 Claims, 2 Drawing Sheets

POLYOLEFIN

TECHNICAL FIELD

The present invention relates to a polyolefin, and more particularly, to a polyolefin having a narrow molecular weight distribution and showing a characteristic comonomer distribution.

The application claims the benefit of Korean Patent Application No. 10-2013-0116760 filed in the Korean Intellectual Property Office on Sep. 30, 2013, and Korean Patent Application No. 10-2014-0129367 filed in the Korean Intellectual Property Office on Sep. 26, 2014, the entire contents of which are incorporated herein by reference.

BACKGROUND ART

The Dow company announced [Me$_2$Si(Me$_4$C$_5$)NtBu] TiCl$_2$ (Constrained-Geometry Catalyst, CGC) early 1990s (U.S. Pat. No. 5,064,802). The CGC has two excellent properties in a copolymerization reaction of ethylene with alpha-olefin as compared to existing known metallocene catalysts, which is summarized as follows: (1) Even at a high polymerization temperature, high activity is exhibited and a high molecular weight of a copolymer is produced, and (2) it is significantly excellent for copolymerization of alpha-olefin having high steric hindrance such as 1-hexene and 1-octene. Besides, at the time of polymerization reaction, as various properties of the CGC have been gradually known, efforts to synthesize a derivative thereof to be used as a polymerization catalyst have actively been conducted in academic and industrial fields.

As one approach among the efforts, synthesis of a metal compound into which various bridges instead of a silicone bridge and a nitrogen substituent are introduced and polymerization using the synthesized metal compound have been attempted. Representative metal compounds known so far are shown as follows (*Chem. Rev.* 2003, 103, 283).

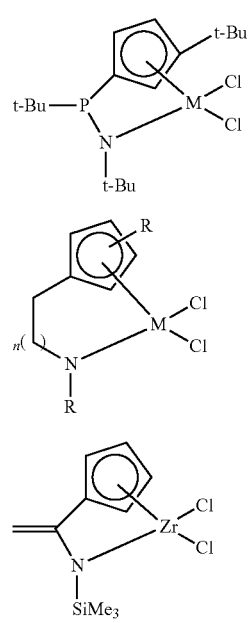

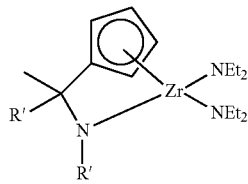

In the compounds shown as above, phosphorus (1), ethylene or propylene (2), methylidene (3) and methylene (4) bridges instead of the silicone bridge of the CGC structure are introduced, respectively. However, when the above listed compounds are applied to polymerization of the ethylene or the copolymerization of ethylene with alpha-olefin, as compared to the CGC, excellent results are not exhibited in view of a polymerization activity, a copolymerization performance, or the like.

As other approaches, compounds having an oxido ligand instead of an amido ligand of the CGC have been synthesized in many times, and polymerization using the compounds also has partially attempted.

However, among these attempts, only a few catalysts are commercially available in practice. Most of copolymers of ethylene and alpha-olefin polymerized using transition metal compounds have a narrow molecular weight distribution as compared to a low density polyethylene (LPDE) obtained from existing high pressure process; however, in view of a polymer structure, the copolymers of ethylene and alpha-olefin polymerized using the transition metal compounds do not include a long chain branch; or include a relatively small amount of long chain branch. Recently, efforts to obtain polyolefin-based copolymers having a polymer structure including a long chain branch and having various properties have actively been conducted in academic and industrial fields, and development of novel catalysts and processes has still been demanded.

SUMMARY OF INVENTION

Technical Problem

The present invention has been made in an effort to provide a polyolefin having advantage of having a narrow molecular weight distribution and a comonomer distribution having new composition, by controlling the comonomer distribution according to a molecular weight using a metallocene catalyst.

Solution to Problem

An exemplary embodiment of the present invention provides a polyolefin having a molecular weight distribution of 1.5 to 3.0 and having a branch gradient number (BGN) of 0.01 to 1.0, wherein the BGN is calculated by Equation 1 below:

$$\text{Branch Gradient Number } (BGN) = \frac{\left(\begin{array}{c}\text{Branch content of high molecular weight} - \\ \text{Branch content of low molecular weight}\end{array}\right)}{(\text{Branch content of low molecular weight})} \quad [\text{Equation 1}]$$

in Equation 1, the branch gradient number is a measure of a distribution of a content of the at least one alpha-olefin comonomer according to a molecular weight of polyolefin, the branch content is a number of the at least one alpha-olefin comonomer incorporated per 1000 carbon atoms in a molecular weight distribution curve using GPC-FTIR in which an x-axis represents a log value of a molecular weight (log Mw) and a y-axis value represents a molecular weight distribution (dwt/dlog Mw) with respect to the log value, the branch content of low molecular weight is a branch content at a left side boundary of the curve without a first 10% content of the curve, the branch content of high molecular weight is a branch content at a right side boundary of the curve without the last 10% content of the curve.

According to the present invention, there is provided a polyolefin having a narrow molecular weight distribution and showing a unique comonomer distribution to have excellent impact strength and mechanical physical properties. Therefore, the polyolefin according to the present invention may be used alone or may be blended with other polymers to be variously used in fields such as household goods, automobiles, shock absorbers, and the like, requiring high impact strength and elasticity.

DESCRIPTION OF EMBODIMENTS

Figure 1:
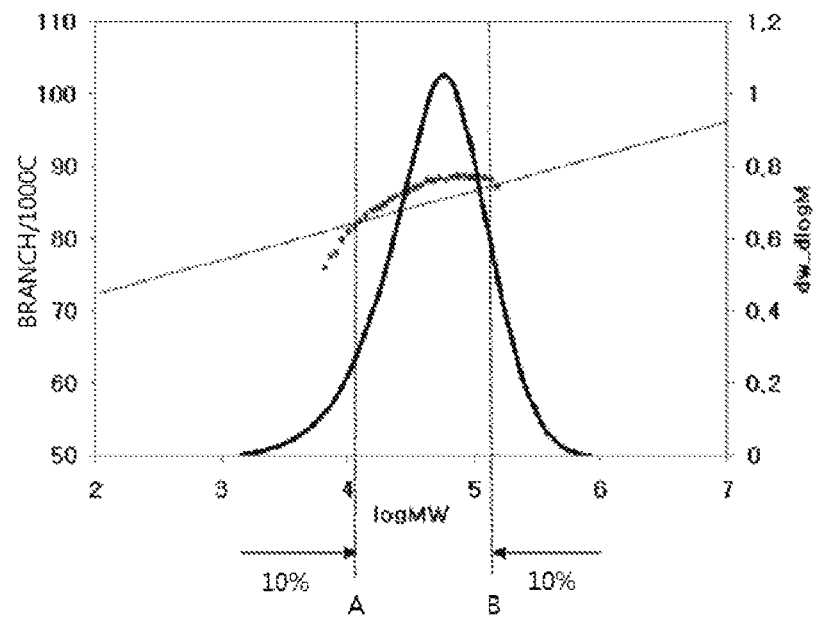
FIG. 1 is a graph showing measurement results of GPC-FTIR of a polyolefin according to Example 1.

Terms such as first, second, and the like, used herein, are used for explaining various components, and these terms are used to distinguish one component from another component.

The terminology used herein is for the purpose of describing particular embodiments only and is not intended to be limiting of the present invention. As used herein, the singular forms are intended to include the plural forms as well, unless the context clearly indicates otherwise. It will be further understood that the terms "comprises", "provides" and/or "having," when used in this specification, specify the presence of stated features, integers, steps, or components, or combinations thereof, but do not exclude the presence or addition of one or more other features, integers, steps, components, or combinations thereof.

Although the present invention can be modified variously and have several embodiments, the exemplary embodiments are illustrated in the accompanying drawings and will be described in detail in the detailed description. However, the present invention is not limited to the specific embodiments and should be construed as including all the changes, equivalents, and substitutions included in the spirit and scope of the present invention.

Hereinafter, a polyolefin according to an exemplary embodiment of the present invention will be described in detail.

According to an exemplary embodiment of the present invention, the present invention provides a polyolefin having a molecular weight distribution of 1.5 to 3.0 and having a branch gradient number (BGN) of 0.01 to 1.0, wherein the BGN is calculated by Equation 1 below:

$$\text{Branch Gradient Number } (BGN) = \frac{\left(\begin{array}{c}\text{Branch content of high molecular weight} - \\ \text{Branch content of low molecular weight}\end{array}\right)}{(\text{Branch content of low molecular weight})} \quad \text{[Equation 1]}$$

In a term: branch gradient number (BGN) used in the present specification, the BGN is a measure showing distribution of a content of a comonomer such as alpha-olefin according to a molecular weight. A branch in the BGN indicates branches attached to a main chain, which are obtained by derivation from alpha-olefins such as propylene, 1-butene, 1-hexene, 1-octene, and the like, used as comonomers at the time of polymerization process of the polyolefin. In addition, the branches include all of a short carbon branch (SCB) having C2 to C6 and a long carbon branch (LCB) having C7 or more.

A molecular weight, a molecular weight distribution, and a branch content may be continuously measured at the same time, by a GPC-FTIR spectroscopy.

BGN values are calculated according to Equation 1 below by continuously measuring the molecular weight, the molecular weight distribution and the branch content by the GPC-FTIR spectroscopy, and by constructing a molecular weight distribution curve using GPC-FTIR in which an x-axis represents a log value (log Mw) of a molecular weight (Mw) and a y-axis represents a molecular weight distribution (dwt/dlog Mw) with respect to the log value. The branch gradient number is a measure of a distribution of a content of the at least one alpha-olefin comonomer according to a molecular weight of polyolefin, The branch content is a number of the at least one alpha-olefin comonomer incorporated per 1000 carbon atoms in a molecular weight distribution curve using GPC-FTIR in which an x-axis represents a log value of a molecular weight (log Mw) and a y-axis value represents a molecular weight distribution (dwt/dlog Mw) with respect to the log value. The branch content of low molecular weight is a branch content at a left side boundary of the curve without a first 10% content of the curve. The branch content of high molecular weight is a branch content at a right side boundary of the curve without the last 10% content of the curve.

$$\text{Branch Gradient Number } (BGN) = \frac{\left(\begin{array}{c}\text{Branch content of high molecular weight} - \\ \text{Branch content of low molecular weight}\end{array}\right)}{(\text{Branch content of low molecular weight})} \quad \text{[Equation 1]}$$

A positive (+) BGN value indicates that the branch content is low at a low molecular weight region according to a molecular weight distribution curve with respect to the log value of the molecular weight and the branch content is relatively high at a high molecular weight region. On the contrary, a negative (−) BGN value indicates that the branch content is high at the low molecular weight region and the branch content is relatively low at the high molecular weight region.

In the polyolefin of the present invention, the BGN values measured and calculated by the above-described method have a range of 0.01 to 1.0, or about 0.01 to about 0.9, or about 0.01 to about 0.5, or about 0.01 to about 0.2, or about 0.01 to about 0.1, or about 0.03 to about 0.1. That is, the polyolefin of the present invention has a structure in which the branch content is low in the low molecular weight region and the branch content is relatively high in the high molecular weight region, and has a slope within the above-described range.

When the BGN values are within the above-described ranges and the narrow molecular weight distribution is satisfied at the same time, the polyolefin may have optimized physical properties to achieve high impact strength and excellent mechanical physical properties. Accordingly, when compounding with other polymers such as a polypropylene resin, high impact strength and excellent mechanical physical properties may be achieved.

In addition, in the polyolefin of the present invention, the number of branch content having 2 or more carbon atoms per 1000 carbon atoms may be about 20 to about 120, preferably, about 50 to about 100.

Further, the polyolefin of the present invention has a molecular weight distribution (weight average molecular weight)/(number average molecular weight) ranging from about 1.0 to about 3.0, or about 1.5 to about 3.0, or about 1.5 to about 2.8, or about 2.0 to about 2.8. As described above, the polyolefin of the present invention may have a significantly narrow molecular weight distribution to exhibit high impact strength.

In addition, the polyolefin may have a melt index (MI) ranging from about 0.1 to about 2000 g/10 min, preferably, about 0.1 to about 1000 g/10 min, and more preferably, about 0.1 to 500 g/10 min, measured under 190° C. and 2.16 kg of a load condition according to ASTM D1238. However, the present invention is not limited thereto.

Further, the polyolefin may have a melt flow rate ratio (MFRR) of about 5 to about 15, and preferably, about 6 to about 13. However, the present invention is not limited thereto.

In addition, the polyolefin may have a density of about 0.85 to about 0.91 g/cc, preferably, about 0.86 to about 0.91 g/cc, and more preferably, about 0.86 to about 0.90 g/cc. However, the present invention is not limited thereto.

Meanwhile, when the MI, the MRFF, the density, and the like, satisfy the above-described ranges, the physical properties may be more optimized, and high impact strength and excellent mechanical physical properties may be achieved.

The polyolefin according to the present invention is preferably a copolymer of ethylene which is an olefin-based monomer and an alpha-olefin comonomer.

As the alpha-olefin comonomer, alpha-olefin having 3 or more carbon atoms may be used. Examples of the alpha-olefin having 3 or more carbon atoms may include propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-octadecene, and 1-eicosene.

In the copolymer of the ethylene and the alpha-olefin-based comonomer, the alpha-olefin comonomer may have a content of about 5 to about 70 wt %, preferably, about 5 to about 60 wt %, and more preferably, about 10 to about 50 wt %.

The polyolefin according to the present invention may have a weight average molecular weight of about 10,000 to about 500,000 g/mol, and preferably, about 20,000 to about 200,000 g/mol. However, the present invention is not limited thereto.

The polyolefin according to the present invention may have excellent impact strength at the time of blending with other polymers, to be variously used in fields such as household goods, automobiles, shock absorbers, and the like.

The polyolefin according to the present invention having the above-described characteristics may be obtained by copolymerization of ethylene with alpha-olefin using a hybrid metallocene compound including two kinds of metallocene compounds having different structures as the catalyst, and the polyolefin may have the molecular weight distribution and the BGN values as described above.

More specifically, the polyolefin of the present invention may be obtained by polymerization of ethylene with alpha-olefin comonomer in the presence of the hybrid metallocene catalyst including a first metallocene compound represented by Chemical Formula 1 and a second metallocene compound represented by Chemical Formula 2:

[Chemical Formula 1]

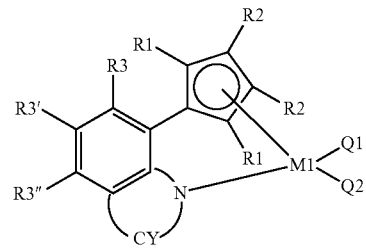

in Chemical Formula 1,

R1 and R2 may be the same as each other or different from each other, and each independently hydrogen; C1 to C20 alkyl; C2 to C20 alkenyl; C6 to C20 aryl; C1 to C20 alkylsilyl; C6 to C20 arylsilyl; C7 to C20 alkylaryl; C7 to C20 arylalkyl; or a metalloid of a Group 4 metal substituted with hydrocarbyl; and R1 and R2 or two R2s may be linked with each other via alkylidine including C1 to 20 alkyl or C6 to C20 aryl functional group to form a ring;

R3, R3' and R3" may be the same as each other or different from each other, and each independently hydrogen; halogen; C1-C20 alkyl; C2 to C20 alkenyl; C6 to C20 aryl; C7 to C20 alkylaryl; C7 to C20 arylalkyl; C1 to C20 alkoxy; C6 to C20 aryloxy; or an amido group; and two or more of R3, R3' and R3" may be linked with each other to form an aliphatic ring or an aromatic ring;

CY may be a substituted or unsubstituted aliphatic or aromatic ring, where a substituent substituted in the CY may be halogen; C1 to C20 alkyl; C2 to C20 alkenyl; C6 to C20 aryl; C7 to C20 alkylaryl; C7 to C20 arylalkyl; C1 to C20 alkoxy; C6 to C20 aryloxy; C1 to C20 alkylamido group; or C6 to C20 arylamido group; where when the substituent is in plural, two or more substituents among the substituents may be linked with each other to form an aliphatic or aromatic ring;

M1 is a Group 4 transition metal; and

Q1 and Q2 may be the same as each other or different from each other, and each independently halogen; C1 to C20 alkyl; C2 to 20 alkenyl; C6 to 20 aryl; C7 to C20 alkylaryl; C7 to C20 arylalkyl; C1 to C20 alkylamido; C6 to C20 arylamido; or C1 to C20 alkylidene.

[Chemical Formula 2]

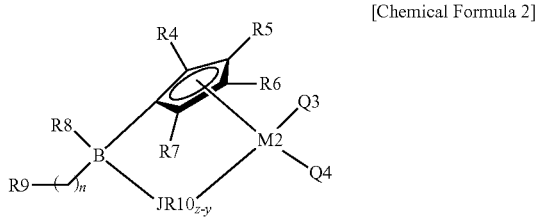

in Chemical Formula 2,

M2 is a Group 4 transition metal;

Q3 and Q4 may be the same as each other or different from each other, and each independently halogen; C1 to C20 alkyl; C2 to C20 alkenyl; C6 to C20 aryl; C7 to C20 alkylaryl; C7 to C20 arylalkyl; C1 to C20 alkylamido; C6 to C20 arylamido; or C1 to C20 alkylidene;

R4 to R10 may be the same as each other or different from each other, and each independently hydrogen; C1 to C20 alkyl; C2 to C20 alkenyl; C1 to C20 alkoxy; C6 to C20 aryl; C1 to C20 alkylsilyl; C6 to C20 arylsilyl; C7 to C20 alkylaryl; or C7 to C20 arylalkyl;

B is carbon, silicon, or germanium, and is a bridge which links a cyclopentadienyl-based ligand with $JR10_{z-y}$ by a covalent bond;

J is a Group 15 element or a Group 16 element on the periodic table;

z is an oxidation number of an element J;

y is a bond number of an element of J; and n is an integer of 0 to 10.

When polymerizing ethylene with the alpha-olefin comonomer using the hybrid metallocene catalyst including the first metallocene compound represented by Chemical Formula 1 and the second metallocene compound represented by Chemical Formula 2, the polyolefin having a structure in which the branch content is low at a low molecular weight region and the branch content is relatively high at a high molecular weight region as described above may be obtained.

Meanwhile, the polymerization reaction of the ethylene with alpha-olefin comonomer may be performed at about 130 to about 250° C., preferably, about 140 to about 200° C. When the second metallocene compound is mixed with the first metallocene compound to be used, activity of the catalyst may be maintained even during synthesis process at a high temperature of 130° C. or more, such that active sites of the catalyst in the synthesis process of the polyolefin may be 2 or more. In particular, since the metallocene catalyst for synthesis of high density polyolefin has a low activity at a high temperature region, the metallocene catalyst is generally not used in the solution polymerization to which a high reaction temperature is applied. However, when the second metallocene compound represented by Chemical Formula 2 is mixed with the first metallocene compound represented by Chemical Formula 1, excellent catalytic activity may be exhibited even at a high temperature of 130° C. or more.

In addition, the polymerization reaction of the ethylene and the alpha-olefin comonomer may be processed by a continuous solution polymerization process, a bulk polymerization process, a suspension polymerization process or a emulsion polymerization process. Preferably, the solution polymerization in a single reactor may be performed. In a method of preparing the polyolefin, the polyolefin is capable of being synthesized in the single reactor even though two different metallocene catalysts are used, such that the manufacturing process may be simplified to reduce processing time and cost.

Specific examples of the first metallocene compound represented by Chemical Formula 1 may include a compound represented by Chemical Formula 3 or a compound represented by Chemical Formula 4. However, the present invention is not limited thereto:

[Chemical Formula 3]

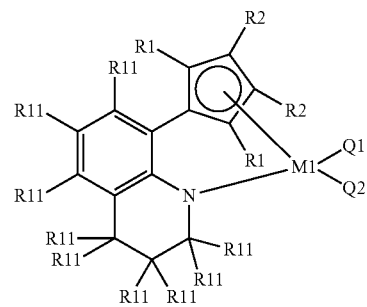

in Chemical Formula 3,

R1, R2, Q1, Q2 and M1 may be defined as the same as Chemical Formula 1;

R11s may be the same as each other or different from each other, and each independently hydrogen; halogen; C1 to C20 alkyl; C2 to C20 alkenyl; C6 to C20 aryl; C7 to C20 alkylaryl; C7 to C20 arylalkyl; C1 to C20 alkoxy; C6 to C20 aryloxy; or an amido group; and two or more of R11s may be linked with each other to form an aliphatic ring or an aromatic ring.

[Chemical Formula 4]

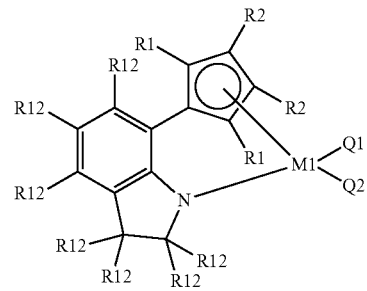

in Chemical Formula 4,

R1, R2, Q1, Q2 and M1 may be defined as the same as Chemical Formula 1;

R12s may be the same as each other or different from each other, and each independently hydrogen; halogen; C1 to C20 alkyl; C2 to C20 alkenyl; C6 to C20 aryl; C7 to C20 alkylaryl; C7 to C20 arylalkyl; C1 to C20 alkoxy; C6 to C20 aryloxy; or an amido group; and two or more of R12s may be linked with each other to form an aliphatic ring or an aromatic ring.

In addition, specific examples of compounds which are preferred for controlling three-dimensional electronic environment around the metal in the compound represented by Chemical Formula 1 are as follows.

In Chemical Formulas below, R2 may be each independently hydrogen or a methyl group, Q1 or Q2 may be the same as each other or different from each other, and each independently a methyl group, a dimethylamido group, or a chloride group:

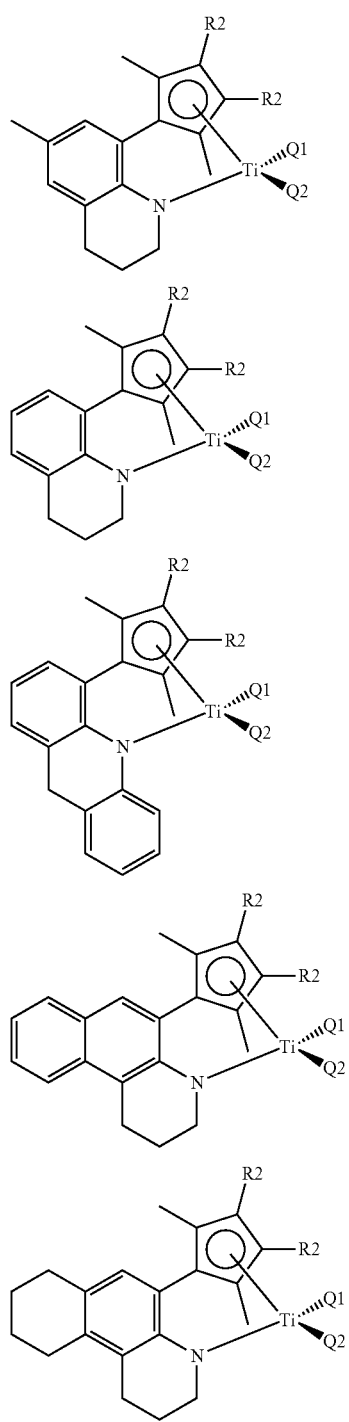
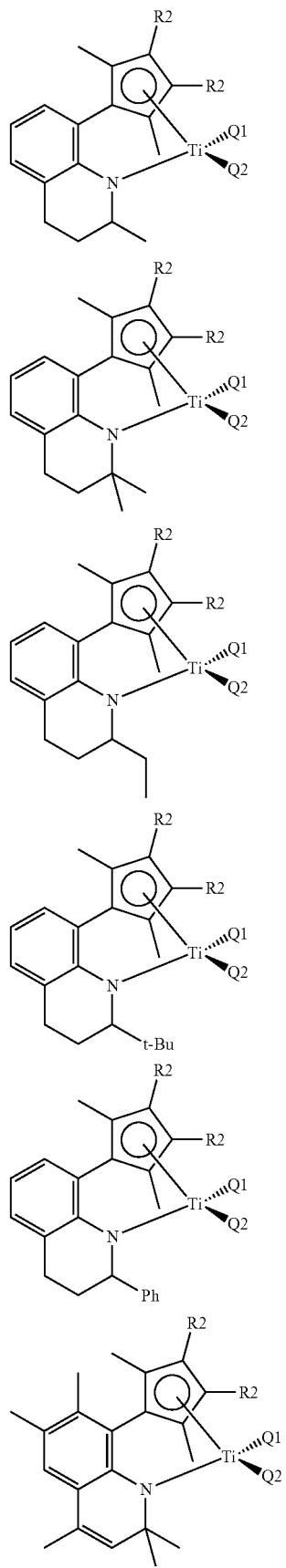

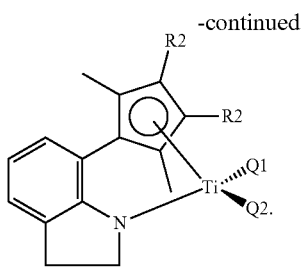

Specific examples of the second metallocene compound represented by Chemical Formula 2 may include compounds as shown below. However, the present invention is not limited thereto:

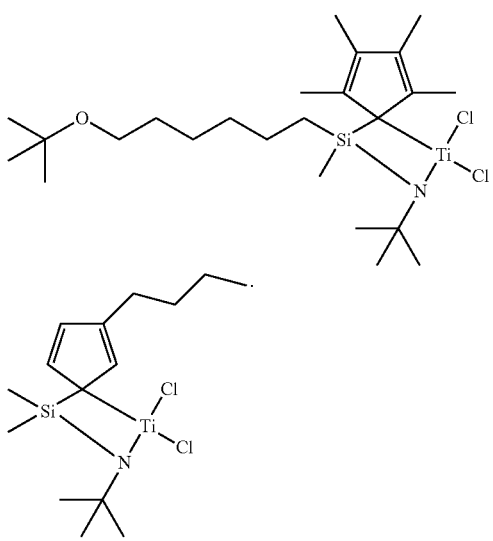

According to an exemplary embodiment of the present invention, in the method of preparing the polyolefin, the hybrid metallocene catalyst may further include a co-catalyst compound in addition to the above-described first and second metallocene compounds.

The co-catalyst compound may include a Group 13 metal on the periodic table, and may be at least one selected from the group consisting of a compound represented by Chemical Formula 5 below, a compound represented by Chemical Formula 6 below, and a compound represented by Chemical Formula 7 below:

  [Chemical Formula 5]

in Chemical. Formula 5, R13 is a halogen radical, a C1 to C20 hydrocarbyl radical, or a C1 to C20 hydrocarbyl radical substituted with halogen, and c is an integer of 2 or more,

  [Chemical Formula 6]

in Chemical Formula 6, D is aluminum or boron, and R14 is C1 to C20 hydrocarbyl, or C1 to C20 hydrocarbyl substituted with halogen,

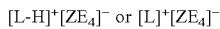  [Chemical Formula 7]

in Chemical Formula 7,
L is a neutral or cationic Lewis base, H is a hydrogen atom, Z is a group 13 element, E may be the same as each other or different from each other, and each independently a C6 to C20 aryl group or a C1 to C20 alkyl group of which at least one hydrogen atom is unsubstituted or substituted with halogen, C1 to C20 hydrocarbon, alkoxy, or phenoxy.

Examples of the compound represented by Chemical Formula 5 may include methyl aluminoxane (MAO), ethyl aluminoxane, isobutyl aluminoxane, butyl aluminoxane, and the like.

Examples of the alkyl metal compound represented by Chemical Formula 6 may include trimethyl aluminum, triethyl aluminum, triisobutyl aluminum, tripropyl aluminum, tributyl aluminum, dimethylchloro aluminum, dimethyl isobutyl aluminum, dimethyl ethyl aluminum, diethyl chloro aluminum, triisopropyl aluminum, tri-s-butyl aluminum, tricyclopentyl aluminum, tripentyl aluminum, triisopentyl aluminum, trihexyl aluminum, ethyldimethyl aluminum, methyl diethyl aluminum, triphenyl aluminum, tri-p-tolyl aluminum, dimethyl aluminum methoxide, dimethyl aluminum ethoxide, trimethyl boron, triethyl boron, triisobutyl boron, tripropyl boron, tributyl boron, and the like.

Examples of the compound represented by Chemical Formula 7 may include triethyl ammonium tetraphenyl boron, tributyl ammonium tetraphenyl boron, trimethyl ammonium tetraphenyl boron, tripropyl ammonium tetraphenyl boron, trimethyl ammonium tetra(p-tolyl)boron, tripropyl ammonium tetra(p-tolyl)boron, triethyl ammonium tetra(o,p-dimethylphenyl)boron, trimethyl ammonium tetra (o,p-dimethylphenyl)boron, tributyl ammonium tetra(p-trifluoromethylphenyl)boron, trimethyl ammonium tetra(p-trifluoromethylphenyl)boron, tributyl ammonium tetra pentafluorophenyl boron, N,N-diethylanilinium tetraphenyl boron, N,N-diethylanilinium tetra pentafluorophenyl boron, diethyl ammonium tetra pentafluorophenyl boron, triphenylphosphonium tetraphenyl boron, trimethyl phosphonium tetraphenyl boron, triethyl ammonium tetraphenyl aluminum, tributyl ammonium tetraphenyl aluminum, trimethyl ammonium tetraphenyl aluminum, tripropyl ammonium tetraphenyl aluminum, trimethyl ammonium tetra (p-tolyl) aluminum, tripropyl ammonium tetra(p-tolyl)aluminum, triethyl ammonium tetra(o,p-dimethylphenyl)aluminum, tributyl ammonium tetra(p-trifluoromethylphenyl)aluminum, trimethyl ammonium tetra(p-trifluoromethylphenyl)aluminum, tributyl ammonium tetrapenta fluorophenyl aluminum, N,N-diethylanilinium tetraphenyl aluminum, N,N-diethylanilinium tetra pentafluorophenyl aluminum, diethyl ammonium tetra pentafluorophenyl aluminum, triphenylphosphonium tetraphenyl aluminum, trimethyl phosphonium tetraphenyl aluminum, triphenyl carbonium tetraphenylboron, triphenyl carbonium tetraphenyl aluminum, triphenyl carbonium tetra(p-trifluoromethylphenyl)boron, triphenyl carbonium tetra pentafluorophenyl boron, and the like.

In addition, the co-catalyst may have a content so that a molar ratio between a Group 13 metal and a Group 4 metal of the first and second metallocene compounds is about 1 to about 10,000, preferably, about 1 to about 1,000, and more preferably, about 1 to about 500. When the molar ratio is less than 1, an effect by the addition of the co-catalyst is not sufficient, and when the molar ratio is more than 10,000, an excessive amount of alkyl group which does not participate in the reaction but remains hinders the catalytic reaction, which may act as a catalytic poison. Therefore, side-reaction is performed which causes a problem that an excessive amount of aluminum or boron remains on the polymer.

As the reaction solvent at the time of preparing the hybrid metallocene catalyst, hydrocarbon-based solvents such as pentane, hexane, heptane, and the like, or aromatic-based solvents such as benzene, toluene, and the like, may be used.

However, the present invention is not necessarily limited thereto, and all solvents which are usable in the art may be used as the reaction solvent.

In the method of preparing the polyolefin according to the present invention, the hybrid metallocene catalyst may be injected by dissolving or diluting the hybrid metallocene catalyst with a solvent of C5 to C12 aliphatic hydrocarbon which is suitable for an olefin polymerization process, such as pentane, hexane, heptane, nonane, decane, and isomers thereof, with a solvent of aromatic hydrocarbon such as toluene and benzene, a solvent of hydrocarbon substituted with a chlorine atom such as dichloromethane chlorobenzene, and the like. It is preferred that the solvent used herein is treated with a small amount of alkylaluminum so as to remove a small amount of water, air, or the like, acting as the catalytic poison, and the co-catalysts may be used more.

By using the hybrid metallocene catalyst, the polyolefin satisfying the above described physical properties may be prepared. When the hybrid metallocene catalyst is used, the copolymerization with the alpha-olefin may be induced particularly by the second metallocene compound forming the high molecular weight part, thereby preparing the polyolefin having high performance in which the alpha-olefin comonomer is intensively coupled on high molecular weight chains.

The preparation of the polyolefin may be performed by solution polymerization, for example, may be performed according to conventional methods while continuously supplying ethylene and the alpha-olefin comonomer at a predetermined ratio.

When ethylene is copolymerized with alpha-olefin as the comonomer using the hybrid metallocene catalyst, examples of the alpha-olefin comonomer may include propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-octadecene, 1-eicosene and the like. However, the present invention is not limited thereto.

When ethylene is copolymerized with alpha-olefin as the comonomer using the hybrid metallocene catalyst, a polymerization temperature may be about 130 to about 250° C., preferably, about 140 to about 200° C. As described above, when the second metallocene compound is mixed with the first metallocene compound to be used, activity of the catalyst may be maintained even during synthesis process at a high temperature of 130° C. or more, such that active sites of the catalyst in the synthesis process of the polyolefin may be 2 or more. In particular, since the metallocene catalyst for synthesis of high density polyolefin has a low activity at a high temperature region, the metallocene catalyst is generally not used in the solution polymerization to which a high reaction temperature is applied. However, when the second metallocene compound represented by Chemical Formula 2 is mixed with the first metallocene compound represented by Chemical Formula 1, excellent catalytic activity may be exhibited even at a high temperature of 130° C. or more.

In addition, a polymerization pressure is preferably performed at about 1 to about 150 bar, more preferably, about 1 to about 120 bar, and the most preferably, about 10 to about 120 bar.

Meanwhile, in the polymerization reaction of ethylene and the alpha-olefin comonomer, physical properties of the polyolefin to be prepared may be controlled by controlling a content of the second metallocene compound.

In particular, the hybrid metallocene catalyst includes the second metallocene compound in a relatively low content. More specifically, the second metallocene compound may have a content of more than 0 mol % to less than about 50 mol %, preferably, about 5 to about 30 mol %, and more preferably, about 5 to about 25 mol % on the basis of the total content of the first and second metallocene compounds. When the second metallocene compound having the above-described content ratio is included, the polyolefin having the positive BGN value within the above-described range while having the narrow molecular weight distribution may be provided.

The present invention will be described in more detail in the following Examples. The following examples are for merely exemplifying the present invention, and therefore, the scope of the present invention is not limited to the following examples.

EXAMPLE

Preparation Example of Metallocene Compound

Preparation Example 1

Synthesis of First Metallocene Compound

Preparation Example 1-1

Preparation of (8-(2,3,4,5-tetramethyl-1,3-cyclopentadienyl)-1,2,3,4-tetrahydroquinoline)

1,2,3,4-tetrahydroquinoline (13.08 g, 98.24 mmol) and diethylether (150 mL) were put into a Schlenk flask. The Schlenk flask was immersed in a low temperature bath having dry ice and acetone at −78° C., and stirred for 30 minutes. Then, n-BuLi (n-butyl lithium, 39.3 mL, 2.5M, 98.24 mmol) was injected thereinto under nitrogen atmosphere by syringe to form a light yellow slurry. Next, after the flask was stirred for 2 hours, a temperature of the flask was increased to room temperature while removing the produced butane gas. After the flask was immersed in the low temperature bath at −78° C. again to decrease the temperature, $CO_2$ gas was injected. As the carbon dioxide gas was injected, the slurry became a transparent solution. The flask was connected to a bubbler to remove the carbon dioxide gas, and the temperature was increase to room temperature. Then, extra $CO_2$ gas and solvent were removed under vacuum. After the flask was transferred into a dry box, pentane was added thereto, strongly stirred, filtrated, to obtain lithium carbamate which was a white solid compound. The white solid compound had coordinated diethylether. Here, a yield was 100%.

1H NMR (C6D6, C5D5N): δ 1.90 (t, J=7.2 Hz, 6H, ether), 1.50 (br s, 2H, quin-$CH_2$), 2.34 (br s, 2H,quin-$CH_2$), 3.25 (q, J=7.2 Hz, 4H, ether), 3.87 (br, s, 2H, quin-$CH_2$), 6.76 (br d, J=5.6 Hz, 1H,quin-CH)ppm 13C NMR (C6D6): δ 24.24, 28.54, 45.37, 65.95, 121.17, 125.34, 125.57, 142.04, 163.09(C=O)ppm.

The prepared lithium carbamate compound (8.47 g, 42.60 mmol) was put into a Schlenk flask. Then, tetrahydrofurane (4.6 g, 63.9 mmol) and diethylether (45 mL) were sequentially put thereinto. The Schlenk flask was immersed in a low temperature bath having acetone and small amount of dry ice at −20° C., stirred for 30 minutes, and tert-BuLi (25.1 mL, 1.7 M, 42.60 mmol) was put thereinto. Here, a color of the reaction mixture was changed to a red color. The reaction mixture was stirred for 6 hours while maintaining the temperature of −20° C. A $CeCl_3 \cdot 2LiCl$ solution (129 mL, 0.33 M, 42.60 mmol) dissolved in tetrahydrofurane, and tetramethylcyclopentynone (5.89 g, 42.60 mmol) were mixed in a syringe, and injected into the flask under nitrogen atmosphere. A temperature of the flask was slowly increased to room temperature. After 1 hour, the thermostatic bath was removed, and the temperature was maintained at room temperature. Then, after water (15 mL) was added to the flask, ethyl acetate was added thereto, then, the reaction mixture was filtrated to obtain a filtrate. After the filtrate was transferred to a separatory funnel, hydrochloric acid (2N, 80 mL) was put thereinto and shaken for 12 minutes. Then, saturated sodium bicarbonate aqueous solution (160 mL) was put thereinto for neutralization, and the reaction mixture was extracted to obtain an organic layer. Anhydrous magnesium sulfate was added to the organic layer to remove moisture, then filtrated to obtain a filtrate, and a solvent was removed therefrom. The obtained filtrate was purified by column chromatography using hexane and ethyl acetate (v/v, 10:1) solvent to obtain a yellow oil. A yield was 40%.

1H NMR (C6D6): δ 1.00 (br d, 3H, Cp-CH3), 1.63~1.73 (m, 2H, quin-$CH_2$), 1.80 (s, 3H, Cp-$CH_3$), 1.81(s, 3H, Cp-$CH_3$), 1.85 (s, 3H, Cp-$CH_3$), 2.64 (t, J=6.0 Hz, 2H, quin-$CH_2$), 2.84~2.90 (br, 2H, quin-$CH_2$), 3.06 (br s, 1H, Cp-H), 3.76 (br s, 1H, N—H), 6.77 (t, J=7.2 Hz, 1H, quin-CH), 6.92 (d, J=2.4 Hz, 1H, quin-CH), 6.94 (d, J=2.4 Hz, 1H, quin-CH) ppm.

Preparation Example 1-2

Preparation of [(1,2,3,4-tetrahydroquinoline-8-yl)tetramethylcyclopentadienyl-eta5,kapa-N]titanium dimethyl After the compound (8.07 g, 32.0 mmol) prepared from Preparation Example 1-1 and 140 mL of diethylether were put into a round flask in a dry box, a temperature was decreased to −30° C., and n-BuLi (17.7 g, 2.5 M, 64.0 mmol) was slowly added thereto while stirring. The reaction mixture reacted for 6 hours while increasing the temperature to room temperature. Then, the reaction mixture was washed with diethylether several times, and filtrated to obtain a solid. The remaining solvent was removed under vacuum to thereby obtain a dilithium compound (Compound 4a) (9.83 g) as a yellow solid. A yield was 95%.

1H NMR (C6D6, C5D5N): δ 2.38 (br s, 2H, quin-$CH_2$), 2.53 (br s, 12H, Cp-$CH_3$), 3.48 (br s, 2H, quin-$CH_2$), 4.19 (br s, 2H, quin-$CH_2$), 6.77 (t, J=6.8 Hz, 2H, quin-CH), 7.28 (br s, 1H, quin-CH), 7.75 (brs, 1H, quin-CH) ppm.

$TiCl_4$.DME (4.41 g, 15.76 mmol) and diethylether (150 mL) were put into a round flask in a dry box, and stirred at −30° C., then MeLi (21.7 mL, 31.52 mmol, 1.4 M) was slowly added thereto. After stirring for 15 minutes, the prepared [(1,2,3,4-tetrahydroquinoline-8-yl)tetramethylcyclopentadienyl-eta5,kapa-N]dilithium compound (5.30 g, 15.76 mmol) (Compound 4a) was put into the flask. The reaction mixture was stirred for 3 hours while increasing the temperature to room temperature. After the reaction was completed, the solvent was removed under vacuum, and the reaction mixture was dissolved in pentane and filtrated to obtain a filtrate. The pentane was removed under vacuum to obtain a dark brown compound (3.70 g). A yield was 71.3%.

1H NMR (C6D6): δ 0.59 (s, 6H, Ti—$CH_3$), 1.66 (s, 6H, Cp-$CH_3$), 1.69 (br t, J=6.4 Hz, 2H, quin-$CH_2$),2.05 (s, 6H, Cp-$CH_3$), 2.47 (t, J=6.0 Hz, 2H, quin-$CH_2$), 4.53 (m, 2H, quin-$CH_2$), 6.84 (t, J=7.2 Hz, 1H, quin-CH), 6.93 (d, J=7.6 Hz, quin-CH), 7.01 (d, J=6.8 Hz, quin-CH) ppm.

13C NMR (C6D6): δ 12.12, 23.08, 27.30, 48.84, 51.01, 119.70, 119.96, 120.95, 126.99, 128.73, 131.67, 136.21 ppm.

Preparation Example 2

Synthesis of Second Metallocene Compound

Preparation of [methyl(6-t-butoxyhexyl)silyl($\eta^5$-tetramethylCp)(t-Butylamido)]$TiCl_2$ After 50 g of Mg(s) was added to a 10 L reactor at room temperature, 300 mL of THF was added thereto. After 0.5 g of $I_2$ was added thereto, a temperature of the reactor was maintained at 50° C. After the temperature of the reactor was stabilized, 250 g of 6-t-butoxyhexyl chloride was added to the reactor using a feeding pump at a rate of 5 mL/min. It could be observed that the temperature of the reactor was increased by about 4 to 5° C. as 6-t-butoxyhexyl chloride was added thereto. 6-t-butoxyhexyl chloride was continuously added thereto and stirred for 12 hours. After 12 hours, a black reaction solution could be obtained. Water was added to 2 mL of the obtained black solution to obtain an organic layer, and 6-t-butoxyhexane was confirmed by $^1$H-NMR, which could be appreciated that a Grignard reaction was well performed. Accordingly, 6-t-butoxyhexyl magnesium chloride was synthesized.

500 g of $MeSiCl_3$ and 1 L of THF were added to the reactor, and a temperature of the reactor was cooled to −20° C. 560 g of the synthesized 6-t-butoxyhexyl magnesium chloride was added to the reactor at a rate of 5 mL/min using the feeding pump. After the Grignard reagent was injected, the temperature of the reactor was slowly increased to room temperature while stirring for 12 hours. After 12 hours, it was confirmed that a white $MgCl_2$ salt was produced. 4 L of hexane was added to remove salt through a laboratory pressure dewatering filtration apparatus (Labdori, HAN KANG ENG. CO., LTD.) to thereby obtain a filtrated solution. After the obtained filtrated solution was put into the reactor, hexane was removed at 70° C. to obtain a light yellow liquid. It could be confirmed that the obtained liquid was a desired methyl(6-t-butoxyhexyl)dichlorosilane compound through $^1$H-NMR.

$^1$H-NMR ($CDCl_3$): 3.3 (t, 2H), 1.5 (m, 3H), 1.3 (m, 5H), 1.2 (s, 9H), 1.1 (m, 2H), 0.7 (s, 3H)

1.2 mol (150 g) of tetramethylcyclopentadiene and 2.4 L of THF were added to the reactor, and a temperature of the reactor was cooled to −20° C. 480 mL of n-BuLi was added to the reactor at a rate of 5 mL/min using the feeding pump. After n-BuLi was added thereto, the temperature of the reactor was slowly increased to room temperature while stirring for 12 hours. After 12 hours, an equivalent amount of methyl(6-t-butoxy hexyl)dichlorosilane (326 g, 350 mL) was rapidly added to the reactor. After the temperature of the reactor was slowly increased to room temperature while stirring for 12 hours, the temperature of the reactor was cooled to 0° C. again, and 2 equivalents of t-$BuNH_2$ was added thereto. The temperature of the reactor was slowly increased to room temperature while stirring for 12 hours. After 12 hours, THF was removed, and 4 L of hexane was added to remove salt through the labdori to thereby obtain a filtrated solution. After the obtained filtrated solution was added to the reactor again, hexane was removed at 70° C. to obtain a yellow solution. It could be confirmed that the obtained yellow solution was methyl(6-t-butoxyhexyl)(tetramethylCpH)t-butylaminosilane compound through $^1$H-NMR.

$TiCl_3(THF)_3$ (10 mmol) was rapidly added to a dilithium salt of a ligand at −78° C., which was synthesized from n-BuLi and the ligand dimethyl(tetramethylCpH)t-butylaminosilane in THF solution. A temperature of the reaction solution was slowly increased from −78° C. to room temperature while stirring for 12 hours. After stirring for 12 hours, an equivalent amount of PbCl$_2$ (10 mmol) was added to the reaction solution at room temperature, and stirred for 12 hours. After stirring for 12 hours, a dark black solution with a blue color could be obtained. After THF was removed from the obtained reaction solution, the product was filtrated by adding hexane thereto. After hexane was removed from the obtained filtrated solution, it was confirmed by $^1$H-NMR that the reaction solution was desired [methyl(6-t-butoxyhexyl)silyl($\eta^5$-tetramethylCp)(t-Butylamido)]TiCl$_2$ compound.

$^1$H-NMR (CDCl$_3$): 3.3 (s, 4H), 2.2 (s, 6H), 2.1 (s, 6H), 1.8~0.8 (m), 1.4 (s, 9H), 1.2 (s, 9H), 0.7 (s, 3H)

Examples for Polymerizing Polyolefin

Example 1

After a 2 L autoclave reactor in a continuous manner was filled with hexane solvent (5.38 kg/h) and 1-butene (0.82 kg/h), a temperature of an upper end of the reactor was preheated to 160° C. A triisobutylaluminum compound (0.05 mmol/min), the obtained first metallocene compound (0.45 μmol/min), the obtained second metallocene compound (0.05 μmol/min), and dimethylanilinium tetrakis(pentafluorophenyl)borate co-catalyst (1.5 μmol/min) were injected into the reactor at the same time. Then, after ethylene (0.87 kg/h) was put into the autoclave reactor and the reactor was maintained in the continuous manner at a pressure of 89 bar at 160° C. for 30 minutes or more, the copolymerization reaction was conducted to obtain the copolymer. Next, remaining ethylene gas was removed, the obtained polymer solution was dried in a vacuum oven for 12 hours or more, and physical properties were measured.

Example 2

After a 2 L autoclave reactor in a continuous manner was filled with hexane solvent (5.9 kg/h) and 1-butene (1.01 kg/h), a temperature of an upper end of the reactor was preheated to 160° C. A triisobutylaluminum compound (0.05 mmol/min), the obtained first metallocene compound (0.4 μmol/min), the obtained second metallocene compound (0.1 μmol/min), and dimethylanilinium tetrakis(pentafluorophenyl)borate co-catalyst (1.5 μmol/min) were injected into the reactor at the same time. Then, after ethylene (1.0 kg/h) was put into the autoclave reactor and the reactor was maintained in the continuous manner at a pressure of 89 bar at 160° C. for 30 minutes or more to conduct the copolymerization reaction, the copolymer was obtained. Next, remaining ethylene gas was removed, the obtained polymer solution was dried in a vacuum oven for 12 hours or more, and physical properties were measured.

Comparative Example 1

Linear low-density polyethylene (LLDPE) (SN318 manufactured by LG Chem.) made by using Ziegler-Natta catalyst was prepared.

Comparative Example 2

An ethylene-1-butene copolymer (LC565 manufactured by LG Chem.) made by using only the first metallocene catalyst was prepared.

Experimental Example

Physical properties of the polyolefins according to Examples 1 and 2 and Comparative Examples 1 and 2 were measured by the following methods and the measurement results were shown in Table 1.

1) Density: ASTM 1505
2) Melt Index (MI, 2.16 kg/10 minutes): Measurement temperature 190° C., ASTM 1238
3) Molecular Weight and Molecular Weight Distribution: Number average molecular weight, weight average molecular weight, and Z-average molecular weight were measured under measurement temperature of 160° C. by using gel permeation chromatography-FTIR (GPC-FTIR). The molecular weight distribution was shown as a ratio between the weight average molecular weight and the number average molecular weight.
4) BGN (Branch gradient number): For the measurement result of the GPC-FTIR, a branch content of a low molecular weight and a branch content of a high molecular weight were calculated by Equation 1 below to obtain the BGN value. The branch gradient number is a measure of a distribution of a content of the at least one alpha-olefin comonomer according to a molecular weight of polyolefin, The branch content is a number of the at least one alpha-olefin comonomer incorporated per 1000 carbon atoms in a molecular weight distribution curve using GPC-FTIR in which an x-axis represents a log value of a molecular weight (log Mw) and a y-axis value represents a molecular weight distribution (dwt/dlog Mw) with respect to the log value. The branch content of low molecular weight is a branch content at a left side boundary of the curve without a first 10% content of the curve. The branch content of high molecular weight is a branch content at a right side boundary of the curve without the last 10% content of the curve.

$$\text{Branch Gradient Number } (BGN) = \frac{\begin{pmatrix} \text{Branch content of high molecular weight} - \\ \text{Branch content of low molecular weight} \end{pmatrix}}{(\text{Branch content of low molecular weight})} \quad \text{[Equation 1]}$$

TABLE 1

| | Density (Unit: g/cc) | Melt Index (MI) (Unit: g/10 min) | Molecular Weight Distribution | Weight Average Molecular Weight (g/mol) | BGN |
|---|---|---|---|---|---|
| Example 1 | 0.865 | 4.5 | 2.31 | 91,791 | 0.05 |
| Example 2 | 0.865 | 5.0 | 2.35 | 89,912 | 0.06 |
| Comparative Example 1 | 0.92 | 1 | 3.72 | 153,101 | −0.14 |
| Comparative Example 2 | 0.865 | 4.6 | 2.32 | 86,610 | 0 |

The measurement results of GPC-FTIR on the polyolefins according to Examples 1 and 2 and Comparative Examples 1 and 2 were shown in FIGS. 1 to 4, respectively.

Figure 2:
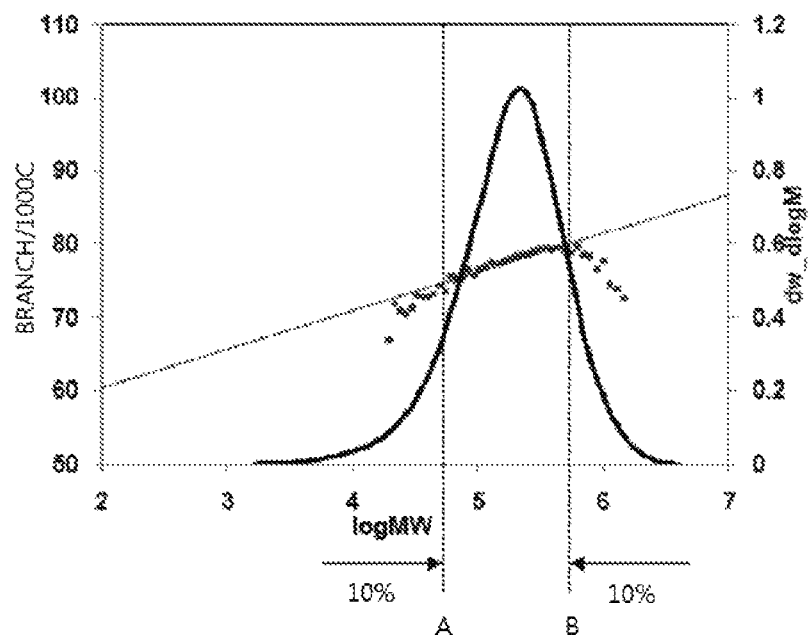
FIG. 2 is a graph showing measurement results of GPC-FTIR of a polyolefin according to Example 2.

Referring to FIGS. 1 and 2, it could be confirmed that the BGN value obtained by Equation 1 above using the measured branch content of 2 or more carbon atoms at the left side boundary (Point A) of the middle part (80%) of the molecular weight distribution curve and the measured branch content of 2 or more carbon atoms at the right side boundary (Point B) was a positive value.

Figure 3:
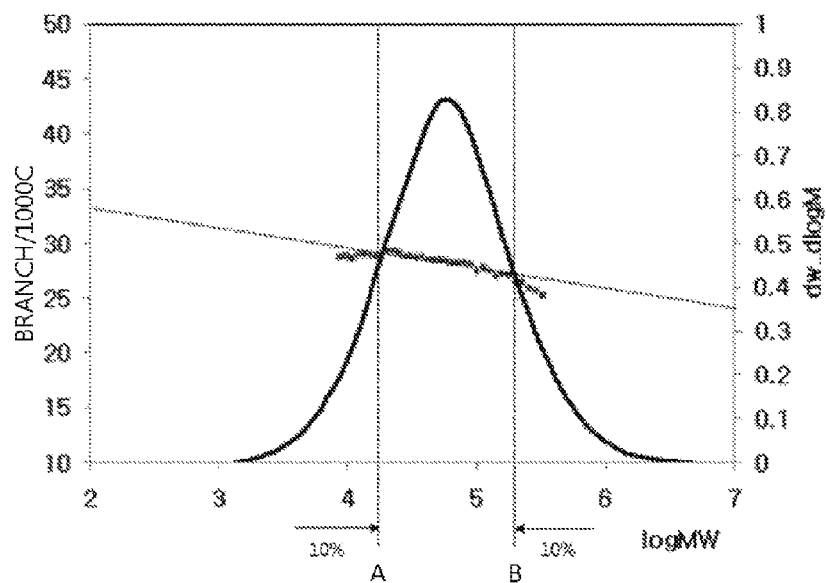
FIG. 3 is a graph showing measurement results of GPC-FTIR of a polyolefin according to Comparative Example 1.

Referring to FIG. 3, it could be confirmed that the polyolefin according to Comparative Example 1 had a negative BGN value of −0.14, and had a molecular weight distribution of more than 3.

Figure 4:
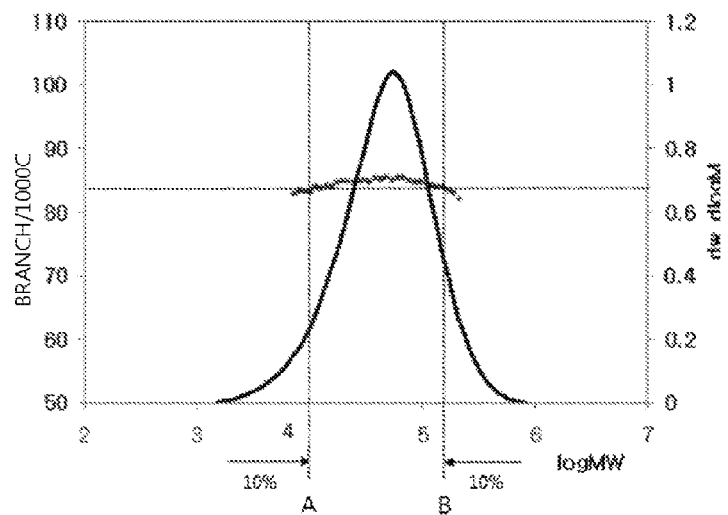
FIG. 4 is a graph showing measurement results of GPC-FTIR of a polyolefin according to Comparative Example 2.

In addition, referring to FIG. 4, it could be confirmed that the polyolefin according to Comparative Example 2 had a BGN value close to 0, such that the characteristic comonomer distribution of the present invention was not shown.

The invention claimed is:

1. A polyolefin, obtained by a process comprising:
copolymerizing ethylene with at least one alpha-olefin comonomer,
wherein the polyolefin has a molecular weight distribution of 1.5 to 3.0 and has a branch gradient number (BGN) of 0.01 to 1.0,
wherein the BGN is calculated by Equation 1 below:

$$\text{Branch Gradient Number }(BGN) = \frac{\left(\begin{array}{c}\text{Branch content of high molecular weight} - \\ \text{Branch content of low molecular weight}\end{array}\right)}{(\text{Branch content of low molecular weight})}$$ [Equation 1]

wherein in Equation 1,
the branch gradient number is a measure of a distribution of a content of the at least one alpha-olefin comonomer according to a molecular weight of polyolefin,
the branch content is a number of the at least one alpha-olefin comonomer incorporated per 1000 carbon atoms in a molecular weight distribution curve using GPC-FTIR in which an x-axis represents a log value of a molecular weight (log Mw) and a y-axis value represents a molecular weight distribution (dwt/dlog Mw) with respect to the log value,
the branch content of low molecular weight is a branch content at a left side boundary of the curve without a first 10% content of the curve,
the branch content of high molecular weight is a branch content at a right side boundary of the curve without the last 10% content of the curve.

2. The polyolefin of claim 1, wherein the polyolefin has a density of 0.85 to 0.91 g/cc.

3. The polyolefin of claim 1, wherein the number of branch content is 20 to 120.

4. The polyolefin of claim 1, wherein the at least one alpha-olefin comonomer has a content of 5 to 70 wt % on the basis of overall polyolefin.

5. The polyolefin of claim 1, wherein the polyolefin is obtained by copolymerizing ethylene with the at least one alpha-olefin comonomer in the presence of a hybrid metallocene catalyst, which comprises a first metallocene compound represented by Chemical Formula 1 and a second metallocene compound represented by Chemical Formula 2:

[Chemical Formula 1]

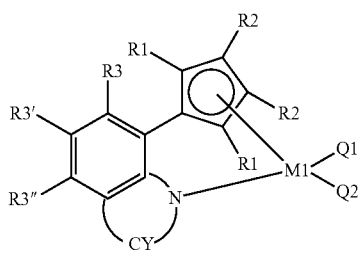

wherein in Chemical Formula 1,
R1 and R2 are each independently hydrogen; C1 to C20 alkyl; C2 to C20 alkenyl; C6 to C20 aryl; C1 to C20 alkylsilyl; C6 to C20 arylsilyl; C7 to C20 alkylaryl; C7 to C20 arylalkyl; or a metalloid of a Group 4 metal substituted with hydrocarbyl; and R1 and R2 or two R2 groups are optionally linked with each other via alkylidine including C1 to 20 alkyl or C6 to C20 aryl functional group to form a ring;
R3, R3' and R3" are each independently hydrogen; halogen; C1-C20 alkyl; C2 to C20 alkenyl; C6 to C20 aryl; C7 to C20 alkylaryl; C7 to C20 arylalkyl; C1 to C20 alkoxy; C6 to C20 aryloxy; or an amido group; and two or more of R3, R3' and R3" are optionally linked with each other to form an aliphatic ring or an aromatic ring;
CY is a substituted or unsubstituted aliphatic or aromatic ring, where a substituent substituted in the CY is halogen; C1 to C20 alkyl; C2 to C20 alkenyl; C6 to C20 aryl; C7 to C20 alkylaryl; C7 to C20 arylalkyl; C1 to C20 alkoxy; C6 to C20 aryloxy; C1 to C20 alkylamido group; or C6 to C20 arylamido group; where when the substituent is in plural, two or more substituents among the substituents are optionally linked with each other to form an aliphatic or aromatic ring;
M1 is a Group 4 transition metal;
Q1 and Q2 are each independently hydrogen; C1 to C20 alkyl; C2 to 20 alkenyl; C6 to 20 aryl; C7 to C20 alkylaryl; C7 to C20 arylalkyl; C1 to C20 alkylamido; C6 to C20 arylamido; or C1 to C20 alkylidene;

[Chemical Formula 2]

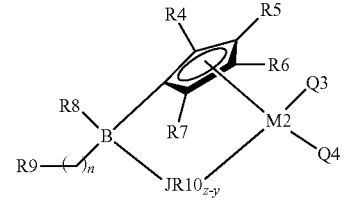

wherein in Chemical Formula 2,
M2 is a Group 4 transition metal;
Q3 and Q4 are each independently halogen; C1 to C20 alkyl; C2 to C20 alkenyl; C6 to C20 aryl; C7 to C20 alkylaryl; C7 to C20 arylalkyl; C1 to C20 alkylamido; C6 to C20 arylamido; or C1 to C20 alkylidene;
R4 to R10 are each independently hydrogen; C1 to C20 alkyl; C2 to C20 alkenyl; C1 to C20 alkoxy; C6 to C20 aryl; C1 to C20 alkylsilyl; C6 to C20 arylsilyl; C7 to C20 alkylaryl; C7 to C20 arylalkyl;
B is carbon, silicon, or germanium, and is a bridge which links a cyclopentadienyl-based ligand with JR10$_{z-y}$ by a covalent bond;
J is a Group 15 element or a Group 16 element on the periodic table;
z is an oxidation number of an element J;
y is a bond number of an element of J; and
n is an integer of 0 to 10.

6. The polyolefin of claim 5, wherein the hybrid metallocene catalyst comprises the second metallocene compound in a content of more than 0 mol % to less than 50 mol % on the basis of the total content of the first and second metallocene compounds.

7. The polyolefin of claim 5, wherein the polymerization of ethylene with the at least one alpha-olefin comonomer is performed by a continuous solution polymerization process.

8. The polyolefin of claim 5, wherein the hybrid metallocene catalyst further comprises at least one co-catalyst selected from the group consisting of compounds represented by Chemical Formulas 5 to 7:

—[Al(R13)-O]$_c$-      [Chemical Formula 5]

wherein in Chemical Formula 5,
R13 is a halogen radical, a C1 to C20 hydrocarbyl radical, or a C1 to 20 hydrocarbyl radical substituted with halogen, and
c is an integer of 2 or more, D(R14)$_3$      [Chemical Formula 6]

wherein in Chemical Formula 6,
D is aluminum or boron, and
R14 is C1 to C20 hydrocarbyl, or C1 to C20 hydrocarbyl substituted with halogen,

[L-H]$^+$[ZE$_4$]$^-$ or [L]$^+$[ZE$_4$]$^-$      [Chemical Formula 7]

wherein in Chemical Formula 7,
L is a neutral or cationic Lewis base, H is a hydrogen atom, Z is a Group 13 element, E are each independently a C6 to C20 aryl group or a C1 to C20 alkyl group of which at least one hydrogen atom is unsubstituted or substituted with halogen, C1 to C20 hydrocarbon, alkoxy, or phenoxy.

9. The polyolefin of claim 5, wherein the polymerization of ethylene with the at least one alpha-olefin comonomer is performed at 130 to 250° C.

10. The polyolefin of claim 5, wherein the at least one alpha-olefin comonomer comprises at least one selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-octadecene and 1-eicosene.

11. The polyolefin of claim 1, wherein the at least one alpha-olefin comonomer comprises at least one selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-octadecene and 1-eicosene.

* * * * *